United States Patent
Tasaki et al.

(10) Patent No.: US 7,817,403 B2
(45) Date of Patent: Oct. 19, 2010

(54) LITHIUM ION CAPACITOR

(75) Inventors: Shinichi Tasaki, Tokyo (JP); Mitsuru Nagai, Tokyo (JP); Hiromoto Taguchi, Tokyo (JP); Kohei Matsui, Tokyo (JP); Risa Takahata, Tokyo (JP); Kenji Kojima, Tokyo (JP); Nobuo Ando, Tokyo (JP); Yukinori Hato, Tokyo (JP); Osamu Hatozaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 340 days.

(21) Appl. No.: 12/063,696

(22) PCT Filed: Jul. 28, 2006

(86) PCT No.: PCT/JP2006/315046

§ 371 (c)(1),
(2), (4) Date: Feb. 13, 2008

(87) PCT Pub. No.: WO2007/026492

PCT Pub. Date: Mar. 8, 2007

(65) Prior Publication Data

US 2009/0097189 A1    Apr. 16, 2009

(30) Foreign Application Priority Data

Aug. 30, 2005   (JP) .............................. 2005-250123

(51) Int. Cl.
*H01G 9/02*    (2006.01)
(52) U.S. Cl. ...................... 361/512; 361/502; 361/504; 361/508; 361/511; 361/525

(58) Field of Classification Search ................. 361/502, 361/503–504, 508–512, 523–525, 528–529
See application file for complete search history.

(56) References Cited

U.S. PATENT DOCUMENTS

| | | | | |
|---|---|---|---|---|
| 5,324,599 A | * | 6/1994 | Oyama et al. | 429/312 |
| 5,498,489 A | * | 3/1996 | Dasgupta et al. | 429/152 |
| 5,877,935 A | * | 3/1999 | Sato et al. | 361/502 |

FOREIGN PATENT DOCUMENTS

| | | |
|---|---|---|
| JP | 8-107048 A | 4/1996 |
| JP | 2002-100409 A | 4/2002 |
| JP | 2005-93779 A | 4/2005 |
| WO | 98/33227 A1 | 7/1998 |
| WO | 2004/059672 A1 | 7/2004 |

\* cited by examiner

*Primary Examiner*—Nguyen T Ha
(74) *Attorney, Agent, or Firm*—McDermott Will & Emery LLP

(57) ABSTRACT

A lithium ion capacitor having high energy density, high output density, high capacity and high safety includes a positive electrode made of a material capable of being reversibly doped with lithium ions and/or anions, a negative electrode made of a material capable of being reversively doped with lithium ions, and an aprotic organic solution of a lithium salt as an electrolytic solution. Wherein, the positive electrode and the negative electrode are laminated or wound with a separator interposed between them, the area of the positive electrode is smaller than the area of the negative electrode. The face of the positive electrode is substantially covered by the face of the negative electrode when they are laminated or wound.

9 Claims, 4 Drawing Sheets

LITHIUM ION CAPACITOR

CROSS-REFERENCE TO PRIOR APPLICATION

This is a U.S. National Phase Application under 35 U.S.C. §371 of International Patent Application No. PCT/JP2006/315046 filed Jul. 28, 2006, which claims the benefit of Japanese Patent Application No. 2005-250123 filed Aug. 30, 2005, both of which are incorporated by reference herein. The International Application was published in Japanese on Mar. 8, 2007 as WO 2007/026492 A1 under PCT Article 21(2).

TECHNICAL FIELD

The present invention relates to a lithium ion capacitor having a high energy density, a high power density and a large capacity.

BACKGROUND ART

In recent years, a battery using as a negative electrode a carbon material such as graphite and using as a positive electrode a lithium-containing metal oxide such as $LiCoO_2$, has been proposed. This battery is a so-called rocking chair battery such that after it is assembled, lithium ions are supplied from the lithium-containing metal oxide as the positive electrode to the negative electrode by charge, and lithium ions are returned from the negative electrode to the positive electrode by discharge. This battery is called a lithium ion secondary battery since no lithium metal is used for the negative electrode but only lithium ions are involved in the charge and discharge, and this battery is distinguished from a lithium battery using lithium metal. This battery is characterized by having a high voltage, a large capacity and high safety.

Further, as concern for environmental problems is increasing, storage system for clean energy by solar power generation or wind power generation, and power sources for electric automobiles and hybrid electric automobiles which replace gasoline-fueled automobiles, have been actively developed. Further, along with the tendency of on-vehicle apparatus and equipment such as power windows and IT devices to high quality and high functionality in recent years, a new power source has been required in view of the energy density and the output density.

As a storage device to be used for such an application which requires a high energy density and high power characteristics, in recent years, attention has been paid to a storage device called a hybrid capacitor comprising a combining storage principles of a lithium ion secondary battery and an electric double layer capacitor. As one example, an organic electrolyte capacitor has been proposed (for example, Patent Document 1) in which as a negative electrode, a carbonaceous material capable of absorbing-desorbing lithium ions and increasing drastically energy density by preliminary absorbing and supporting lithium ions (hereinafter sometimes referred to as doping) by a chemical or electrochemical method to lower the negative electrode potential, is used.

Such an organic electrolyte capacitor is expected to have high performance, but has drawbacks such that when the negative electrode is preliminarily doped with lithium ions, the doping requires a very long time, and it tends to be difficult to make lithium ions be uniformly supported by the entire negative electrode. Particularly, a large-size large capacity cell such as a cylindrical apparatus having electrodes wound or a square battery having a plurality of electrodes laminated, has been considered to be hardly used practically.

To solve such problems, an organic electrolyte battery has been proposed (for example, Patent Document 2), wherein each of a positive electrode current collector and a negative electrode current collector has through holes penetrating from the front surface to the back surface, a negative electrode active material is capable of reversibly supporting lithium ions, and lithium ions are supported by the negative electrode by electrochemical contact with a lithium metal disposed to face the negative electrode or the positive electrode.

In the organic electrolyte battery in which the electrode current collector has through holes penetrating from the front surface to the back surface, lithium ions can move from the front surface to the back surface of the electrode without being blocked by the electrode current collector. Thus, even in a storage device having a cell structure with a number of electrodes laminated, it is possible to make lithium ions be electrochemically supported by not only a negative electrode disposed in the vicinity of lithium metal but also a negative electrode disposed distant from lithium metal, via the through-holes.

Patent Document 1: JP-A-8-107048
Patent Document 2: WO98/033227

DISCLOSURE OF THE INVENTION

Problems that the Invention is to Solve

As described above, with respect to a negative electrode made of e.g. a carbonaceous material capable of absorbing-desorbing (in this specification, referred to as "being doped-undoped with" as defined later) lithium ions and preliminarily absorbed lithium ions, the potential of such a negative electrode is lower than that of an activated carbon to be used for an electric double layer capacitor, and thus the withstand voltage of a cell using such a negative electrode in combination with an activated carbon for the positive electrode tends to improve. Further, since the capacity of the negative electrode is very large as compared with that of an activated carbon, an organic electrolyte capacitor (lithium ion capacitor) having the above negative electrode will have a high energy density.

In the above lithium ion capacitor, the cell is constituted as an electrode unit having positive electrode(s) and negative electrode(s) alternately laminated with separator(s) interposed therebetween, and the negative electrodes are sequentially doped with lithium ions from lithium metal disposed at the outside of the electrode unit so as to face to the positive electrode and/or the negative electrode, through holes penetrating the electrode current collector. It is preferred that all amount of the lithium metal disposed according to the amount of lithium ions for preliminary doping, is uniformly doped into the negative electrode as lithium ions.

The electrode unit constituting the cell is constituted by the positive electrode(s) and the negative electrode(s) laminated or wound together so that they face to each other, and the number of ions doped/undoped into/from the positive electrode(s) is the same as that undoped/doped from/to the negative electrode(s) at a time of charging or discharging of the lithium ion capacitor. Accordingly, between the positive electrode(s) and the negative electrode(s) facing to each other, when the area of the positive electrode is larger than the area of the negative electrode, or when the positive electrode protrudes from the negative electrode even if the area of the positive electrode is smaller than the area of the negative electrode, lithium ions of a number corresponding to the number of anions absorbed in the protruding positive electrode portion are concentrated in an edge portion of the negative electrode. Although there is no problem when charging and discharging are carried out slowly, excess lithium ions may be precipitated as lithium metal on the edge portion of the positive electrode when a large current of charging or discharging is carried out. Particularly, since the lithium metal tends to be precipitated on a current collector portion in the cross section of negative electrode, the precipitation is likely to occur even when the area of positive electrode equals to the area of negative electrode. The precipitation amount increases as charging and discharging of the cell are repeated.

Thus, when lithium metal is precipitated on the edge portion of the negative electrode, the amount of lithium ions preliminary doped into the negative electrode decreases by an amount corresponding to the precipitation amount, and accordingly, the capacitance of the lithium ion capacitor decreases and its performance is deteriorated. Further, there occurs such a problem that the precipitated lithium metal reacts with an electrolytic solution in the lithium ion capacitor to deteriorate the properties of the lithium ion capacitor, to cause short circuit, or to cause exothermic heat or firing of the lithium metal when the outer container is damaged, which deteriorates safety.

The present invention has been made to solve such problems, and it is an object of the present invention to prevent precipitation of the lithium metal on the edge portion of the negative electrode even if charging and discharging of the lithium ion capacitor is repeated, to thereby prevent performance deterioration of the lithium ion capacitor, and to provide a lithium ion capacitor of high safety.

Means of Solving the Problems

In order to solvent the above problems, the present inventors have made extended study of behavior of lithium ions at times of charging and discharging of a cell, and as a result, it has been discovered that precipitation of lithium metal on the edge portion of the negative electrode can be prevented by making the area of positive electrode smaller than the area of the negative electrode facing to the positive electrode, so that the face of the positive electrode is covered by the area of the negative electrode, and further, they identified what degree of size reduction of the positive electrode from the facing negative electrode is effective to prevent the precipitation of lithium metal, to complete the present invention. Namely, the present invention provides a lithium ion capacitor having the following gists.

(1) A lithium ion capacitor comprising a positive electrode made of a material capable of being reversibly doped with lithium ions and/or anions, a negative electrode made of a material capable of being reversively doped with lithium ions, and an aprotic organic solution of a lithium salt as an electrolytic solution, wherein the positive electrode and the negative electrode are laminated or wound with a separator interposed between them, the area of the positive electrode is smaller than the area of the negative electrode, and the face of the positive electrode is substantially covered by the face of the negative electrode when they are laminated or wound.

(2) The lithium ion capacitor according to the above (1), wherein the area of the positive electrode is at least 80% and less than 100% of the area of negative electrode.

(3) The lithium ion capacitor according to the above (1) or (2), wherein at least one of the positive electrode and the negative electrode each has a current collector having through holes penetrating from the front surface to the back surface, and the negative electrode and/or the positive electrode is doped with lithium ions by electrochemical contact of a lithium ion supply source with the negative electrode and/or the positive electrode.

(4) The lithium ion capacitor according to the above (1) to (3), wherein the porosity of the current collector is from 5 to 79%.

(5) The lithium ion capacitor according to any one of the above (1) to (4), wherein the potential of the positive electrode is at most 2.0 V (vs. Li/Li$^+$) after the positive electrode and the negative electrode are short-circuited.

(6) The lithium ion capacitor according to any one of the above (1) to (5), wherein the negative electrode is made of a negative electrode active material capable of being reversibly doped with lithium ions, the positive electrode is made of a positive electrode active material capable of being reversibly doped with lithium ions and/or anions, the negative electrode active material has a capacitance per unit weight at least three times that of the positive electrode active material, and the weight of the positive electrode active material is larger than the weight of the negative electrode active material.

(7) The lithium ion capacitor according to the above (6), wherein the negative electrode active material is any one of graphite, hard carbon and a polyacenic organic semiconductor (PAS) which is a heat-treated aromatic condensed polymer having a polyacenic skeleton structure with an atomic ratio of hydrogen atoms/carbon atoms between 0.50 and 0.05.

(8) The lithium ion capacitor according to the above (6) or (7), wherein the negative electrode active material has a pore diameter of at least 3 nm and a pore volume of at least 0.10 mL/g.

(9) The lithium ion capacitor according to any one of the above (6) to (8), wherein the positive electrode active material is any one of an activated carbon, an electrically conductive polymer and a polyacenic organic semiconductor (PAS) which is a heat-treated aromatic condensed polymer having a polyacenic skeleton structure with an atomic ratio of hydrogen atoms/carbon atoms between 0.50 and 0.05.

EFFECTS OF THE INVENTION

According to the present invention, as described above, the area of the positive electrode is made smaller than the area of the negative electrode, and the positive electrode is disposed so as to be covered by the negative electrode, whereby precipitation of lithium metal on the edge portion of the negative electrode is prevented to prevent increase of positive electrode potential, and whereby it is possible to obtain a lithium ion capacitor is of high quality and high capacitance whose capacitance does not decrease even if charging and discharging of the lithium ion capacitor is repeated.

Further, since precipitation of lithium metal on the edge portion of the negative electrode can be prevented, it is possible to prevent deterioration of lithium ion capacitor properties due to reaction of lithium metal precipitated on the edge portion of the negative electrode with an electrolytic solution in the lithium ion capacitor, or short circuit due to the precipitated lithium metal, or to prevent exothermic heating or firing of lithium metal at a time of damage of the outer container, to thereby obtain a lithium ion capacitor having high safety and high quality.

EXPLANATION OF SYMBOLS

Figure 1:
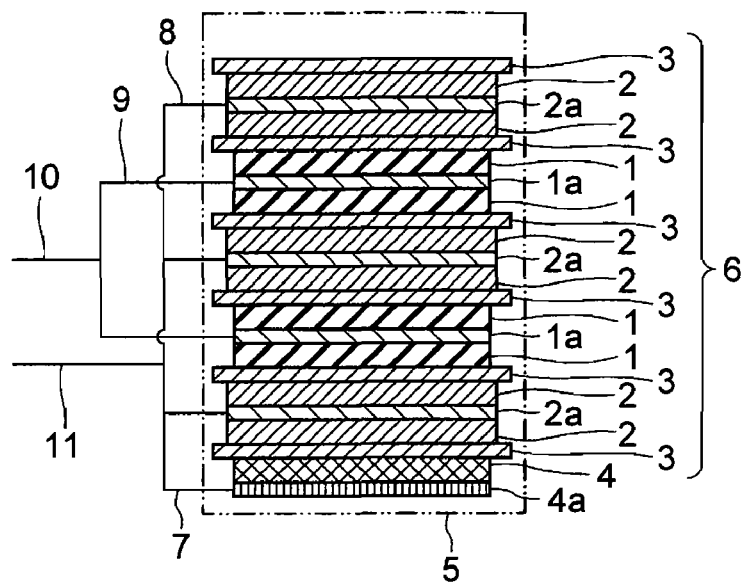
FIG. 1: a cross sectional view of a square lithium ion capacitor of a preferred embodiment of the present invention.

1: Positive electrode, 1a: positive electrode current collector, 2: negative electrode, 2a: negative electrode current collector, 3: separator, 4: lithium metal (lithium ion supply source), 4a: lithium electrode current collector, 5: outer container, 6: electrode unit, 7: lithium electrode lead-out portion, 8,9: lead-out portion, 10: positive electrode connecting terminal, 11: negative electrode connecting terminal, 12: through hole, 13: uncoated portion, 14: positive electrode edge portion, 15: negative electrode edge portion

BEST MODE FOR CARRYING OUT THE INVENTION

In the present invention, "dope" has a meaning including "absorb", "support" or "insert", which is a phenomenon that lithium ions or anions enter into a positive electrode active material, or a phenomenon that lithium ions enter into a negative electrode active material. Further, "undope" has a meaning including "desorption", which is a phenomenon that lithium ions or anions are desorbed from a positive electrode active material, or a phenomenon that lithium ions are desorbed from a negative electrode active material.

The lithium ion capacitor (hereinafter sometimes referred to as LIC) of the present invention comprises a positive electrode made of a material capable of being reversibly doped with lithium ions and/or anions, a negative electrode made of a material capable of being reversibly doped with lithium ions, and an aprotic organic electrolytic solution of a lithium salt as an electrolytic solution. And in a preferred LIC of the present invention, a positive electrode potential after the positive electrode and the negative electrode are short-circuited, is at most 2.0 V (vs. Li/Li$^+$, hereinafter this notation is omitted since this always applies).

In a conventional electric double layer capacitor, usually the same active material (mainly an activated carbon) is used for the positive electrode and the negative electrode in substantially the same amounts. This active material has a potential of about 3 V when a cell is assembled, and when the capacitor is charged, anions form an electric double layer at the surface of the positive electrode thereby to increase the positive electrode potential, and on the other hand, cations form an electric double layer at the surface of the negative electrode thereby to decrease the potential. On the contrary, upon discharging, anions and cations, respectively from the positive electrode and the negative electrode, are released to the electrolytic solution, and the potentials respectively decreases and increases thereby to recover to about 3 V. As mentioned above, as a common carbonaceous material has a potential of about 3.0 V, in an electric double layer capacitor using a carbonaceous material for both the positive electrode and the negative electrode, potentials of the positive electrode and the negative electrode are both about 3 V after the positive electrode and the negative electrode are short-circuited.

On the other hand, in a preferred LIC of the present invention, potential of the positive electrode after the positive electrode and the negative electrode are short-circuited is at most 2.0 V as mentioned above. That is, in the present invention, an active material capable of being reversibly doped with lithium ions and/or anions is used for the positive electrode, an active material capable of being reversibly doped with lithium ions is used for the negative electrode, and lithium ions are preliminarily doped into the negative electrode and/or the positive electrode so that the potential of the positive electrode is at most 2.0 V after the positive electrode and the negative electrode are short-circuited.

In the present invention, the potential of the positive electrode being at most 2V after the positive electrode and the negative electrode are short-circuited, means a potential of the positive electrode of at most 2 V as measured by either of the following two methods (A) and (B) That is, (A) after doping with lithium ions, a positive electrode terminal and a negative electrode terminal of a lithium ion capacitor are directly connected by a conducting wire and the capacitor is left to stand for at least 12 hours in such a state, and then the short circuit is released, and the positive electrode potential is measured within 0.5 to 1.5 hours, (B) after discharging to 0 V at a constant current over a period of at least 12 hours by a charge and discharge testing apparatus, a positive electrode terminal and a negative electrode terminal are connected by a conducting wire and the capacitor is left to stand for at least 12 hours in such a state, and then the short circuit is released, and the positive electrode potential is measured within 0.5 to 1.5 hours.

Further, in the present invention, the positive electrode potential being at most 2.0 V after the positive electrode and the negative electrode are short-circuited is not limited only to the potential immediately after preliminary doping of lithium ions, but means a positive electrode potential of at most 2.0 V after short circuit in state, such as short circuit in a charged state, in a discharged state or after repeated charge and discharge.

In the present invention, the positive electrode potential being at most 2.0 V after the positive electrode and the negative electrode are short-circuited, will be described in detail below. As described above, an activated carbon and a carbon material have a potential at a level of 3 V (Li/Li$^+$). In a case where an activated carbon is used for both the positive electrode and the negative electrode to assemble a cell, since both potentials are about 3 V, the positive electrode potential will be unchanged and about 3 V even when the electrodes are short-circuited. Further, also in the case of a hybrid capacitor using an activated carbon for the positive electrode and using for the negative electrode a carbon material such as graphite or hard carbon to be used for a lithium ion secondary battery, since both the potentials are about 3 V, the positive electrode potential will be unchanged and about 3 V even when the electrodes are short-circuited. The negative electrode potential will move to the vicinity of 0 V by charge although it depends on the balance of positive electrode and negative electrode weights, and it is thereby possible to increase the charge voltage, whereby a capacitor having a high voltage and a high energy density will be obtained. In general, the upper limit of the charge voltage is determined to be a voltage at which no decomposition of the electrolytic solution by an increase of the positive electrode potential will occur. Thus, when the positive electrode potential is at the upper limit, it is possible to increase the charge voltage correspondingly to a decrease of the negative electrode potential.

However, for example, in the above-described hybrid capacitor of which the positive electrode potential is about 3 V at the time of short circuit, if the upper limit potential of the positive electrode is 4.0 V for example, the positive electrode potential upon discharging is limited to 3.0 V, and the change in potential of the positive electrode is at a level of 1.0 V and the capacity of the positive electrode can not sufficiently be utilized. Further, it has been known that when lithium ions are doped into and undoped from the negative electrode, the initial charge and discharge efficiency is low in many cases, and some lithium ions can not be undoped upon discharging. This is explained to be because the lithium ions are consumed for decomposition of the electrolytic solution at the surface of the negative electrode or they are trapped in structural defective portions of the carbon material. In such a case, the charge and discharge efficiency of the negative electrode tends to be low as compared with the charge and discharge efficiency of the positive electrode, the positive electrode potential will be higher than 3 V when the positive electrode terminal and the negative electrode terminal of the hybrid capacitor are short-circuited after charge and discharge are repeatedly carried out, and the utilized capacity will further decrease. That is, if the positive electrode is discharged only from 4.0 V to 3.0 V even if it is supposed to be discharged from 4.0 V to 2.0 V, only half the capacity is utilized, and the capacitor can not have a large capacity although it may have a high voltage.

In order to achieve not only a high voltage and a high energy density but also a large capacity and further a high energy density of a hybrid capacitor, it is required to improve the utilized capacity of the positive electrode.

That is, when the positive electrode potential after the short circuit is lower than 3.0 V, the utilized capacity will increase correspondingly, and a large capacity will be achieved. In order that the positive electrode potential will be at most 2.0 V, it is preferred to dope the negative electrode with lithium ions not only in an amount of lithium ions to be supplied by the charge and discharge of the LIC but also separately from a lithium ion supply source such as lithium metal. As the lithium ions are supplied other than from the positive electrode and the negative electrode, the potential of the positive electrode, the negative electrode and lithium metal are in equilibrium and at most 3.0 V at the time of short circuit. The larger the amount of lithium metal is, the lower the equilibrium potential becomes. As the equilibrium potential changes depending upon the negative electrode material and the positive electrode material, it is required to adjust the amount of lithium ions to be doped into the negative electrode considering characteristics of the negative electrode material and the positive electrode material so that the positive electrode potential after short circuit will be at most 2.0 V.

In LIC of the present invention, the positive electrode potential being at most 2.0 V after the positive electrode and the negative electrode are short-circuited, means that lithium ions are supplied to the positive electrode and/or the negative electrode other than from the positive electrode and the negative electrode of the LIC as mentioned above. The lithium ions may be supplied to one of or both the negative electrode and the positive electrode. However, in a case where an activated carbon is used for the positive electrode for example, if the amount of lithium ions doped is large and the positive electrode potential is low, lithium ions may be irreversibly consumed, and drawbacks such as a decrease in the capacity of the cell may occur in some cases. Thus, it is required to suitably control the amount of lithium ions to be supplied to the negative electrode and the positive electrode so that there will be no drawbacks. In both of these cases, lithium ions preliminarily supplied to the positive electrode and/or the negative electrode are doped into the negative electrode upon charging, and thus, the potential of negative electrode decreases.

Further, in a case where the positive electrode potential is higher than 2.0 V after the positive electrode and the negative electrode are short-circuited, as the amount of lithium ions supplied to the positive electrode and/or the negative electrode is small, the energy density of the cell tends to be low. The larger the amount of lithium ions supplied is, the lower the positive electrode potential becomes after the positive electrode and the negative electrode are short-circuited and the more the energy density will be improved. In order to obtain a high energy density, at most 2.0 V is preferred, and in order to obtain a further higher energy density, at most 1.0 V (Li/Li$^+$) is preferred. When the positive electrode potential is low after the positive electrode and the negative electrode are short-circuited, in other words, when large amount of lithium ions are doped into the negative electrode by charging of LIC, the capacitance of the positive electrode increases and potential change amount of negative electrode decreases, and as a result, potential change amount of the positive electrode increases, capacitance and capacity of the LIC increase and high energy density is realized.

If the positive electrode potential is lower than 1.0 V, drawbacks such as evolution of gas or irreversible consumption of lithium ions may occur depending upon the positive electrode active material, and it tends to be difficult to measure the positive electrode potential. Further, a too low positive electrode potential means an excessive weight of the negative electrode, and the energy density will rather decrease. Accordingly, it is usually at least 0.1 V, preferably at least 0.3 V.

In the present invention, the capacitance and the capacity are defined as follows. The capacitance of a cell represents the slope of a discharge curve of a cell and its unit is F (farad); the capacitance per unit weight of a cell is a value obtained by dividing the capacitance of a cell by the total weight of the positive electrode active material and the negative electrode active material put in a cell and its unit is F/g; the capacitance of a positive electrode represents the slope of a discharge curve of a positive electrode and its unit is F; the capacitance per unit weight of a positive electrode is a value obtained by dividing the capacitance of a positive electrode by the weight of a positive electrode active material put in a cell and its unit is F/g; and the capacitance per unit weight of a negative electrode is a value obtained by dividing the capacitance of a negative electrode by the weight of a negative electrode active material put in a cell and its unit is F/g.

Further, the cell capacity is a product of the capacitance of a cell and a difference between the discharge start voltage and the discharge end voltage of a cell i.e. a change in voltage, and its unit is C (coulomb). 1C is charge quantity when 1A current flows in one second, and thus the unit is calculated as mAh in the present invention. The positive electrode capacity is a product of the capacitance of the positive electrode and a difference (a change in the positive electrode potential) in the positive electrode potential between the discharge start and the discharge end potential, and its unit is C or mAh. Similarly, the negative electrode capacity is a product of the capacitance of the negative electrode, and a difference (change in negative electrode potential) in the negative electrode potential between the discharge start and the discharge end potential, and its unit is C or mAh. The cell capacity agrees with the positive electrode capacity and the negative electrode capacity.

Then, the construction of the lithium ion capacitor of the present invention is described with reference to the drawings. The drawings show preferred embodiments of the present invention, but the present invention is not limited to these embodiments. FIG. 1 is a cross sectional view of a square cell being a typical lithium ion capacitor (hereinafter it is also referred to as a cell) according to the present invention.

In this example, the cell is constituted in such a manner that, as shown in FIG. 1, the positive electrode 1 and the negative electrode 2 are alternately laminated with a separator 3 interposed between them to form an electrode unit 6, lithium metal 4 is disposed for example at lower portion of the electrode unit 6 so as to face to the positive electrode 1 and the negative electrode 2, and they are accommodated in an outer container 5. In the cell, the sizes (areas) of the positive electrode 1 and the negative electrode 2 are different as described later. Each of the positive electrodes 1 laminated is connected to a positive electrode connection terminal 10 via a lead-out portion 9. Further, each of the positive electrodes 2 and the lithium metal 4 are connected with a negative electrode connecting terminal 11 via a lead-out portion 8 and a lead-out portion 7 respectively. Here, in this example, the positive electrode connecting terminal 10 and the negative electrode connecting terminal 11 are disposed in the same side (left side in FIG. 11), but the positions of these connecting terminals may be appropriately selected, and they may be, for example, disposed at respective sides of the cell.

Into the cell thus constituted, an electrolytic solution (electrolyte) capable of transporting lithium ions is injected, the cell is sealed, and the cell is left for a predetermined time (for example, 10 days), whereby the negative electrode 2 can be preliminary doped with lithium ions since the lithium metal 4 and the negative electrode 2 are short-circuited.

In this example, in order to facilitate understanding, 2 layers of positive electrodes and 3 layers of negative electrodes in terms of the number of active material layers, constitute a cell having total 5 layers. Here, the number of positive electrode layers and negative electrode layers in a cell, is appropriately determined according to e.g. the type of cell or the number of lithium metal layers disposed in the cell, and the number is not restricted, but in a square cell, usually preferably about 10 to 20 layers. Further, in FIG. 1, the electrode unit 6 is accommodated laterally (horizontally) in the outer container 5, but the electrode unit 6 can be vertically accommodated in the outer container 5.

In the electrode unit 6 constituting a cell, it is preferred that the outermost portion (bottom portion in FIG. 1) on a side where the lithium metal 4 is disposed is a separator 3, and a negative electrode 2 is disposed adjacently inside the separator 3. By disposing the separator 3 at the outermost portion of the electrode unit 6, it is possible to prevent the lithium metal 4 from directly contacting with the electrode 2, and to prevent a damage of electrode surface due to rapid doping of lithium ions after injecting electrolytic solution. Further, when an electrode unit 6 produced in advance in the outside is inserted into the outer container 5, it is possible to protect an outermost electrode by the separator 3 to prevent its damage. Further, by disposing a negative electrode 2 adjacently inside the outermost separator 3, there is such a merit that there occurs no problem even if the negative electrode 2 contact with the lithium metal 4.

The positive electrode 1 and the negative electrode 2 constituting the above electrode unit 6 are preferably formed as a positive electrode active material layer and a negative electrode active material layer (in the Figure, the positive electrode active material layer and the negative electrode active material layer are shown as positive electrode 1 and negative electrode 2 respectively) on a positive electrode current collector 1a and a negative electrode current collector 2a respectively, so that the active material layers are formed on both sides of each current collector. However, in the negative electrode 2 laminated in the outermost portion of the electrode unit 6, the construction may be such that the negative electrode active material layer is formed only on one side (inner side) of a negative electrode current collector 2a.

Figure 2:
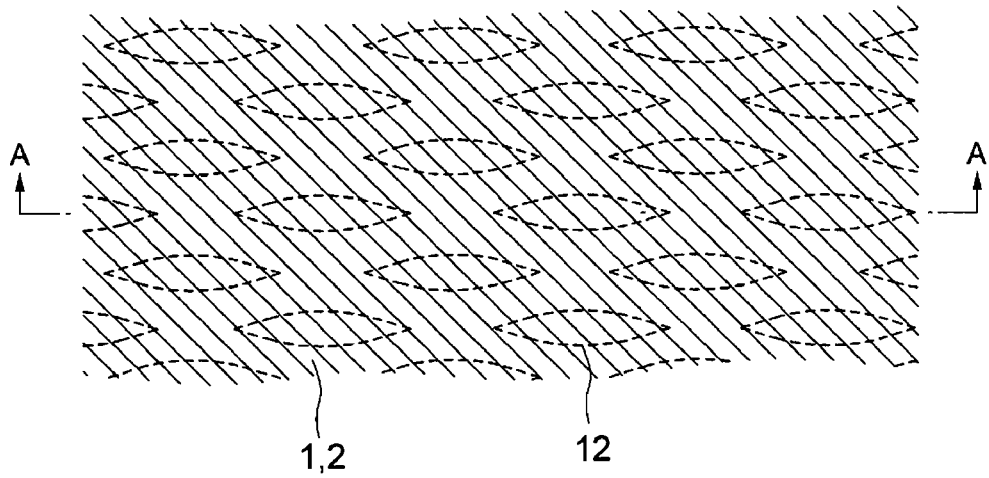
FIG. 2: a partial enlarged view of an electrode of FIG. 1.
Figure 3:
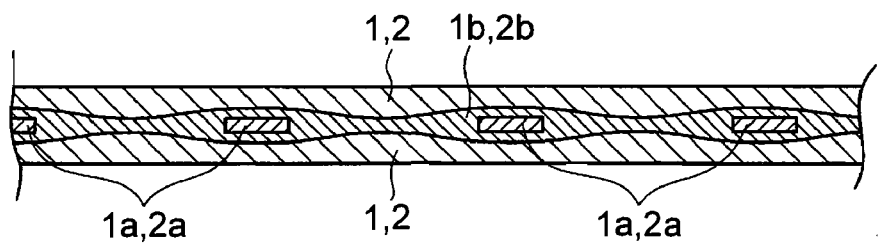
FIG. 3: a cross sectional view of an A-A portion of FIG. 2.

FIG. 2 is an enlarged view of the positive electrode 1 or the negative electrode 2, and FIG. 3 is a cross sectional view of the A-A portion of FIG. 2. The positive electrode 1 and the negative electrode 2 are formed on both sides of the positive electrode current collector 1a and the negative electrode current collector 2a, and these current collectors are made of a material having through holes 12 penetrating from its front surface to rear surface. Thus, by forming through holes on the negative electrode current collector 2a and the positive electrode current collector 1a, even if the lithium metal 4 is, for example, disposed at an end portion of the electrode unit 6, lithium ions from the lithium ion metal 4 can pass through the through holes of both of these current collectors and freely move between electrodes, whereby it is possible to dope all negative electrodes of the electrode unit 6 with lithium ions.

Meanwhile, the lithium metal 4 disposed so as to face to the positive electrode 1 and the negative electrode 2 in the cell, is formed by pasting lithium is metal on the lithium electrode current collector 4a, preferably both sides thereof, by press-bonding. The lithium electrode current collector 4a is preferably one having a through-hole structure similar to those of the positive electrode current collector 1a and the negative electrode current collector 2a so that it facilitates press-bonding of lithium metal and enables lithium ions passing through as the case requires.

Here, a film type cell of lamination type, not shown, has substantially the same cell structure as that of the above-described square cell except that its outer container is different.

Figure 4:
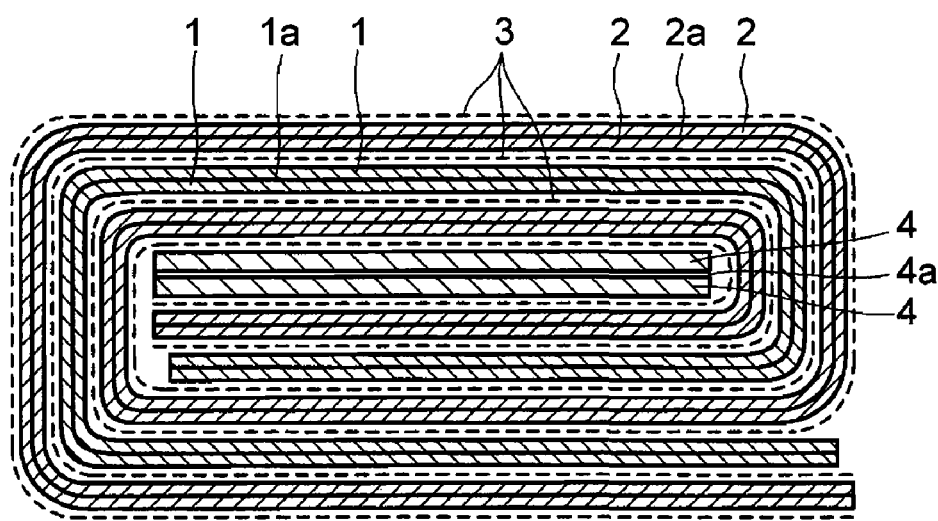
FIG. 4: a cross sectional view of a wound type lithium ion capacitor of a preferred embodiment of the present invention.

FIG. 4 is a cross sectional view of a wound type lithium ion capacitor of another embodiment of the present invention. In this example, strip-shaped positive electrode 1 and negative electrode 2 are wound with a separator 3 interposed between them, to form a flat cylindrical electrode unit 6 so that the outermost portion becomes the separator 3, its adjacently inside portion becomes the negative electrode 2, and the lithium metal 4 is disposed between the negative electrode 2, for example in the central portion of the electrode unit 6, with the separator 3 interposed between them to constitute a cell. In FIG. 4, positive electrodes 1 are formed as positive electrode active material layers on both sides of a strip-shaped positive electrode current collector 1a, and the negative electrode 2 are formed as negative electrode active material layers on both sides of a strip-shaped negative electrode current collector 2a, and the lithium metals 4 are formed on both sides of a lithium electrode current collector 4a.

In the above cell structure, the positive electrode current collector 1a and the negative electrode current collector 2a are each made of a material having through holes in the same manner as the above-described lamination type cell, the lithium metal 4 is short-circuited to, for example, the negative electrode 2, whereby the lithium ions from the lithium metal 4 disposed in the cell core portion move via through holes of both current collectors so that a predetermined amount of lithium ions are doped into the negative electrode 2 of the wound electrode unit 6. As an alternative, the lithium metal 4 may be disposed in the peripheral portion of the electrode unit 6 so that the lithium ions move from the outside of the electrode unit 6 towards the central portion for doping. As another alternative, it may be disposed in each of the central portion and the periphery of the electrode unit 6, so that doping of lithium ions is possible from both the inside and outside of the electrode unit 6. The construction of this example is substantially common to a wound type lithium ion capacitor having a cylindrical electrode unit 6 formed by winding a positive electrode 1 and a negative electrode 2 with a separator 3 interposed between them, though it is not shown.

Figure 5:
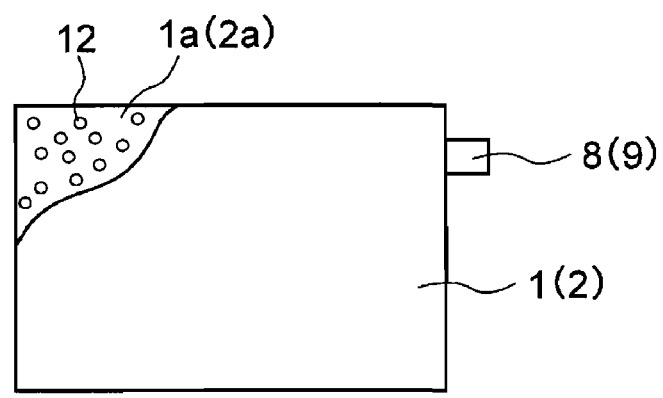
FIG. 5: a plan view of an electrode of the square lithium ion capacitor according to the present invention.

The present invention thus provides a lithium ion capacitor having an electrode unit formed by laminating or winding a positive electrode and a negative electrode, wherein the area of the positive electrode is smaller than the negative electrode so that a positive electrode face is substantially covered by a negative electrode face when the positive electrode and the negative electrode are laminated or wound. In general, since an electrode layer is formed on entire surface of current collector, the areas of the current collector and the electrode (a region where the electrode layer is formed) becomes the same. Accordingly, the positive electrode face and the negative electrode face for in the present invention can be typically considered as regions of the positive electrode and the negative electrode where the positive electrode active material layer and the negative electrode active material layer are formed respectively. For example, in a case of an electrode for a lamination type cell, as shown in FIG. 5, since an electrode layer (positive electrode 1 or negative electrode 2) is formed on a substantially entire surface of the current collector 1a (2a) except for its lead-out portion 8 (9), and thus, the positive electrode face and the negative electrode face correspond to the respective regions where these electrode layers are formed.

Figure 6A:
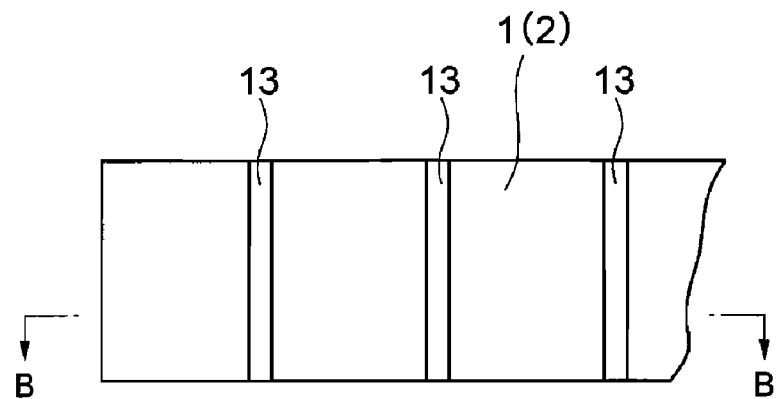
FIG. 6(a): a plan view showing an example of an unwound electrode of the wound lithium ion capacitor according to the present invention.
Figure 6B:
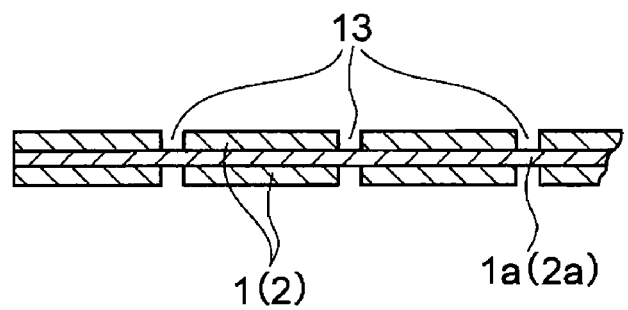
FIG. 6(b): a cross sectional view of a B-B portion of FIG. 6(a).

However, in a case of wound type cell, since an electrode unit is formed by winding strip-shaped electrodes. Accordingly, in a case where the electrodes are ones each having electrode layers 1 (2) on both sides of a current collector 1a (2a) shown in FIGS. 6(a) and 6(b), in order to improve easiness of production, there is a case where the strip-shaded current collector 1a (2a) is intermittently coated with the electrode layers so that non-coated portions 13 not coated with electrode layer are formed in portions of the current collector 1a (2a) for convenience, and a lead-out terminal (not shown) is connected to each of the non-coated portions 13. In such a case where non-coated portions 13 are provided in portions of the current collector 1a (2), the positive electrode face or the negative electrode face is defined as the entire region including the non-coated portions 13 not coated with electrode layer, for simplification. Of course, when an electrode layer is formed on one or each face of the current collector 1a (2) without forming such non-coated portions 13, the region where the electrode layer is formed becomes an electrode face. In the present invention, in each of the cells of lamination type and wound type, a positive electrode and a negative electrode are laminated or wound with a separator interposed between them so that the respective positive electrode face and a negative electrode face are opposed to each other with a separator interposed between them. Accordingly, "a positive electrode face" is substantially covered by a facing "negative electrode face" means that when a positive electrode face and a negative electrode face are thus facing to each other with a separator, the positive electrode face is positioned substantially inside of the negative electrode face, that is, a state that the positive electrode face does not substantially agree with the negative electrode face and that a part or entire portion of the positive electrode is not substantially protruded from the negative electrode face. Specifically, it is a state that the area of the positive electrode is smaller than the area of the negative electrode, and the positive electrode and the negative electrode are well aligned at a time of lamination so that the positive electrode face does not substantially protrude from the negative electrode face. In a case of wound type cell, it means a state that the positive electrode face is substantially positioned inside of the negative electrode facing to the positive electrode with the separator interposed between them, at both ends of an electrode unit formed by winding strip-shaped positive electrode and negative electrode with a separator interposed between them, and at a start portion and an end portion of its winding.

In the present invention, the area of the positive electrode is smaller than the area of the negative electrode so that the positive electrode face is substantially covered by the negative electrode face. In the case of wound type cell, the area of the positive electrode is smaller than the area of the negative electrode when they are unwound by unwinding the electrode unit. The difference between the areas of these electrodes may change between the lamination type and the wound type, or depending on the thickness or the number of winding of the electrodes in the case of wound type, but the area of positive electrode is at least 80% and less than 100%, more preferably at least 85% and at most 98%, further preferably at least 90% and at most 95%. When the area of positive electrode is less than 80% of the area of negative electrode, such a construction is preferred for reducing precipitation of lithium metal on the edge portion of the negative electrode, but such a construction is not preferred in that the area of the positive electrode in the cell is relatively small, the balance between the positive electrode and the negative electrode is excessively lost, whereby charging and discharging efficiency of the cell is deteriorated, the cell capacity per a unit volume is reduced, and energy density is decreased by repeated charging and discharging, which prevents obtaining of high performance cell. When the area of the positive electrode is at least 100% of the negative electrode, namely, when the area of the positive electrode is the same or larger than the area of the negative electrode, lithium metal may precipitate on edge portions of the negative electrode (negative electrode current collector) upon charging and discharging of the cell as described above. When the area of the positive electrode face is at least 80% and less than 100% of the area of the negative electrode face, it is possible to prevent lithium metal from precipitating out on edge portions of the negative electrode to an extent that there occurs no problem, and secure a predetermined cell capacity to obtain a safety and high performance cell.

Figure 7A:
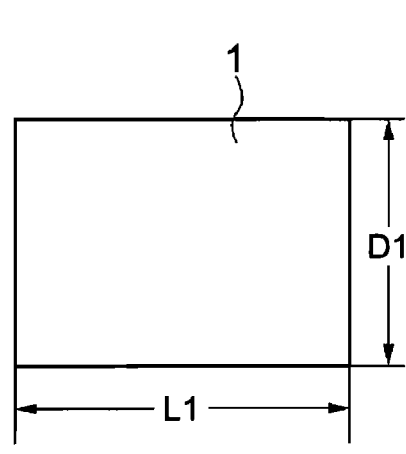
FIG. 7(a): a plan view of a positive electrode of the square lithium ion capacitor according to the present invention.
Figure 7B:
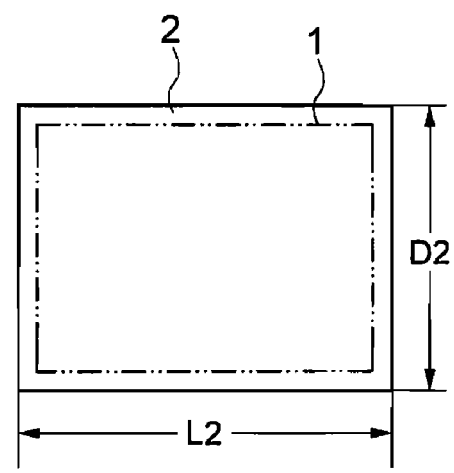
FIG. 7(b): a plan view of a negative electrode of the square lithium ion capacitor according to the present invention.

From now, the relation between the area of negative electrode and the area of positive electrode, is specifically described with reference to drawings. FIGS. 7(a) and 7(b) are plan views of the positive electrode 1 and the negative electrode 2 respectively, that constitute the electrode unit 6 of the square cell shown in FIG. 1. Each of these Figures schematically shows an electrode in which its lead-out portion is omitted. The positive electrode and the negative electrode have rectangular shapes substantially analogous to each other, and by laminating these electrodes alternately with a separator of the same shape interposed between them so that these electrodes face to each other, the electrode unit 6 is formed. When the lateral dimension and the vertical dimension of the positive electrode 1 are L1 and D1 respectively, and the lateral dimension and the vertical dimension of the negative electrode 2 are L2 and D2 respectively, the area (L1×D1) of the positive electrode 1<the area (L2×D2) of the negative electrode 2, and L2>L1 and D2>D1 are satisfied so that the positive electrode face is covered by the negative electrode face. In this case, it is preferred that L1 and D1 is from 90 to 98% of L2 and D2 respectively. By thus determining the dimensions of the positive electrode 1 and the negative electrode 2, it is possible to make the area of the positive electrode 1 at least 80% and less than 100% of the area of the negative electrode 2 facing to the positive electrode 1 with a separator interposed between them.

Further, in the present invention, when such positive electrode 1 and negative electrode 2 are alternately laminated with a separator interposed between them to form an electrode unit, they are laminated so that the positive electrode face does not substantially protrude from the negative electrode face. The chain-dashed line in FIG. 7(b) shows the positive electrode 1 thus laminated. In this case, it is preferred that positive electrode faces of all positive electrode 1 do not protrude from negative electrode faces of all negative electrode 2 to be laminated. When adverse effect of precipitation of lithium metal is in a degree that causing substantially no problem, it is allowable that a part of positive electrodes 1 to be laminated protrudes from the negative electrodes 2 to be laminated or a portion of a positive electrode 1 protrudes from a negative electrode. 2. In the present invention, "substantially no protrusion of positive electrode face from a negative electrode" include such a case.

Here, in this example, explanation has been made with respect to a lamination type cell employing rectangular positive electrode 1 and negative electrode 2, but the shape of electrodes are not limited to rectangle. The present invention can be applied, for example, to a cell formed by laminating circular positive electrode 1 and negative electrode 2, in the same manner.

Figure 8A:
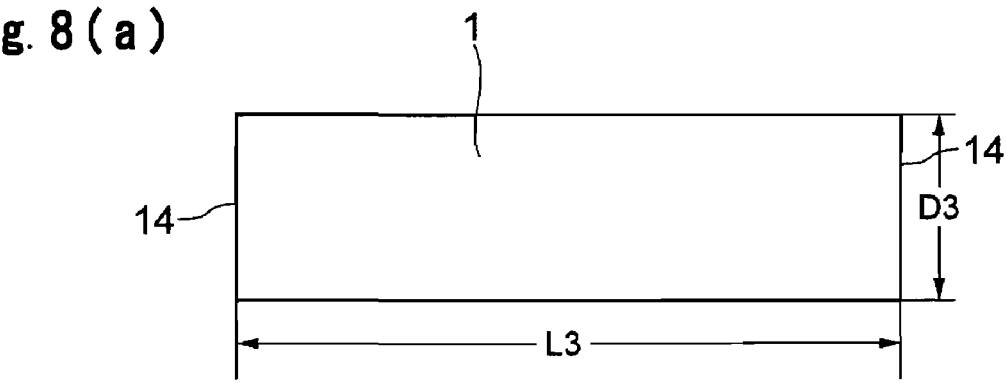
FIG. 8(a): an unwound plan view of a positive electrode of the wound lithium ion capacitor according to the present invention.
Figure 8B:
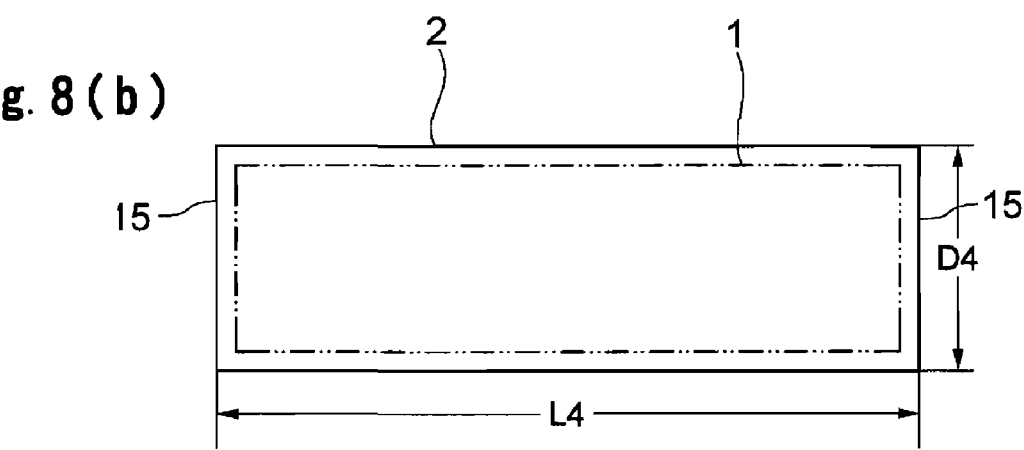
FIG. 8(b) an unwound plan view of a negative electrode of the wound lithium ion capacitor according to the present invention.

Then, explanation is made with respect to a positive electrode 1 and a negative electrode 2 forming an electrode unit 6 (refer to FIG. 4) of a wound type cell. FIGS. 8(a) and 8(b) are plan views showing strip-shaped positive electrode 1 and negative electrode 2, respectively, that are obtained by unwinding the electrode unit of a typical wound type cell of the present invention. The electrode unit of this example is formed by winding strip-shaped positive electrode 1 and negative electrode 2 with a separator interposed between them, so that the negative electrode becomes inside, whereby the negative electrode can be wound around the outside of lithium metal disposed in a core portion with a separator interposed between them, and the outermost layer of the wound electrode unit becomes the positive electrode. In a case of such an electrode unit, when the lateral dimension and the vertical dimension of the positive electrode 1 are L3 and D3 respectively, and the lateral dimension and the vertical dimension of the negative electrode 2 are L4 and D4 respectively, L4 is longer than L3. Conventional wound type cells are the same as the wound type cell of the present invention in this respect, but in a conventional electrode unit, there is a case where at a start point and an end point of the winding of strip-shaped electrodes, the edge portion 14 of the positive electrode 1 substantially agrees with the edge portion 15 of the negative electrode 2, or the edge portion 14 of the positive electrode 1 protrude from the edge portion 15 of the negative electrode 2. Accordingly, there has been a risk that lithium metal precipitates on the end portion 15 of the negative electrode 2.

On the other hand, in the present invention, at the start point and the end point of the winding of an electrode unit, an edge portion 14 of a positive electrode 1 is substantially covered in an edge portion 15 of a negative electrode 2, whereby precipitation of lithium metal on the edge portion 15 of the negative electrode 2 is reduced or prevented, and a positive electrode face is substantially covered in a negative electrode face at edge portions of the electrode unit. Namely, in this example, the relation between the positive electrode 1 and the negative electrode 2 is such that the area (L3×D3) of positive electrode<the area (L4×D4) of negative electrode, L4>L3 and D4>D3 are satisfied. In this case, in order to obtain a high capacity and high quality cell, also of a wound type, if the area of the positive electrode 1 is preferably at least 80% and less than 100% of the area of negative electrode 1. An electrode unit of a wound type cell can be formed by laminating strip-shaped positive electrode 1 and negative electrode 2 having such a relationship with a separator interposed therebetween, so that the positive electrode 1 is not substantially protrude from the negative electrode 2, namely, so that the positive electrode is positioned at a position shown by the dot-dashed line of FIG. 8(b), and winding them.

Now, major components constituting the lithium ion capacitor of the present invention will be explained sequentially below.

For the positive electrode current collector and the negative electrode current collector of the present invention, various materials proposed for use in e.g. an organic electrolyte battery can be usually used. For the positive electrode current collector, aluminum, stainless steel, etc. can be suitably used, and for the negative electrode current collector, stainless steel, copper, nickel, etc. can be suitably used. Further, various shapes such as a foil and a net can be employed. Particularly in order that lithium ions are preliminarily supported by the negative electrode and/or the positive electrode, preferred is one having through holes penetrating from the front surface to the back surface, such as an expanded metal, a perforated metal, a metal net, a foam or a porous foil having through holes imparted by etching. The through holes of the electrode current collector may, for example, be round or rectangular, and may suitably be set.

More preferably, before formation of an electrode, at least some of the through holes on the electrode current collector are filled with an electrically conductive material (1b, 2b in FIG. 3) which is less likely to come off, and each of a positive electrode and a negative electrode is formed thereon by coating, whereby productivity of the electrode will improve and further, a problem of a decrease in reliability of a capacitor by detachment of the electrode will be solved. Further, the electrode including the current collector can be made thin, whereby a high energy density and a high power density will be realized.

The shape, number, etc. of the through holes of the electrode current collector may suitably be set so that lithium ions in an electrolytic solution as described hereinafter can move from the front surface to the back surface of the electrode without being blocked by the electrode current collector, and that the holes will easily be clogged with an electrically conductive material.

The porosity of the electrode current collector is defined by calculating the ratio {1−(weight of the current collector/true specific gravity of the current collector)/(apparent volume of the current collector)} as percentage. The porosity of the electrode current current collector to be used in the present invention is usually from 5 to 79%, preferably from 20 to 60%. It is desirable to suitably select the porosity and the hole size of the electrode current collector from the above range considering the structure and the productivity of the cell.

The above negative electrode active material is not particularly limited so long as it can reversibly support lithium ions, and it may, for example, be graphite, hard carbon or a polyacenic organic semiconductor (PAS) which is a heat-treated aromatic condensed polymer having a polyacenic skeleton structure with an atomic ratio of hydrogen atoms/carbon atoms (hereinafter referred to as H/C) from 0.50 to 0.05. Among them, PAS is more preferred with a view to obtaining a large capacity. A capacitance of at least 650 F/g will be obtained when lithium ions in an amount of 400 mAh/g are doped into PAS having a H/C of about 0.2 by charging, followed by discharging, and a capacitance of at least 750 F/g will be obtained when lithium ions in an amount of at least 500 mAh/g are doped by charging. Thus, it is understood that PAS has a very large capacitance.

In the preferred embodiment of the present invention, in a case where an active material having an amorphous structure such as PAS is used for the negative electrode, the lager the amount of lithium ions to be supported, the lower the potential is. Thus the withstand voltage (charging voltage) of a storage device to be obtained tends to increase, and the voltage-increasing rate (the slope of the discharge curve) in discharging tends to be low. Therefore, it is desirable to suitably set the amount of lithium ions within the lithium ion doping ability of the active material depending upon the desired working voltage of the storage device.

Further, PAS, which has an amorphous structure, is free from structural changes such as swelling and contraction due to doping and undoping of lithium ions and is thereby excellent in cyclic characteristics. Further, it has an isotropic molecular structure (a higher-order structure) for doping and undoping of lithium ions and thereby has excellent characteristics in quick charging and quick discharging, and accordingly it is suitable as a negative electrode material.

An aromatic condensed polymer which is a precursor of PAS is a condensed product of an aromatic hydrocarbon compound with an aldehyde. The aromatic hydrocarbon compound may be suitably a so-called phenol such as phenol, cresol or xylenol. Specifically, it may be a methylene-bisphenol represented by the following formula:

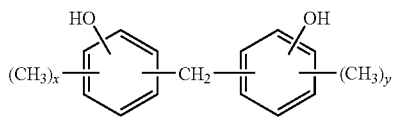

wherein each of x and y which are independent of each other, is 0, 1 or 2, or a hydroxy-bisphenyl or a hydroxynaphthalene. Among them, practically a phenol, particularly phenol is suitable.

Further, the aromatic condensed polymer may also be a modified aromatic condensed polymer having part of the above aromatic hydrocarbon compound having a phenolic hydroxyl group substituted by an aromatic hydrocarbon compound having no phenolic hydroxyl group such as xylene, toluene or aniline, for example, a condensed product of phenol, xylene and formaldehyde. Further, a modified aromatic polymer substituted by melamine or urea may also be used, and a furan resin is also suitable.

In the present invention, PAS is used as an insoluble infusible substrate which may be produced, for example, from the above aromatic condensed polymer as follows. Namely, the aromatic condensed polymer is gradually heated to an appropriate temperature of 400 to 800° C. in a non-oxidizing atmosphere (including vacuum) to obtain an insoluble and infusible substrate having an H/C of 0.5 to 0.05, preferably of 0.35 to 0.10.

However, the method of producing the insoluble and infusible substrate is not limited thereto, and it is possible to obtain an insoluble and infusible substrate having the above H/C and having a specific surface area of at least 600 m²/g as measured by BET method, by a method as disclosed in JP-B-3-24024, for example.

With respect to the insoluble and infusible substrate to be used in the present invention, from X-ray diffraction (CuKα), the main peak is present at the position of at most 24° as represented by 2θ, and another broad peak is present at a position of between 41 and 46° in addition to the above main peak. Namely, the insoluble and infusible substrate has a polyacenic skeleton structure having an aromatic polycyclic structure appropriately developed, has an amorphous structure, and is capable of being stably doped with lithium ions, and is thereby suitable as an active material for a lithium electric storage device.

In the present invention, the negative electrode active material is preferably one having a pore diameter of at least 3 nm and a pore volume of at least 0.10 mL/g, and the upper limit of the pore diameter is not limited but is usually from 3 to 50 nm. Further, the range of the pore volume is also not particularly limited, but is usually from 0.10 to 0.5 mL/g, preferably from 0.15 to 0.5 mL/g.

In the present invention, the negative electrode is formed on a negative electrode current collector from a powder of a negative electrode active material such as the above carbon material or PAS, and its method is not limited and a known method may be used. Specifically, it can be formed by dispersing the negative electrode active material powder, a binder and if necessary, an electrically conductive powder in an aqueous or organic solvent to obtain a slurry, and applying the slurry on the current collector or preliminarily forming the slurry into a sheet, and bonding the sheet on the current collector. The binder to be used may, for example, be a rubber type binder such as SBR, a fluororesin such as polytetrafluoroethylene or polyvinylidene fluoride, or a thermoplastic resin such as a polypropylene or a polyethylene. Among them, a fluorinated binder is preferred, a fluorinated binder having an atomic ratio of fluorine atoms/carbon atoms (hereinafter referred to as F/C) of at least 0.75 and less than 1.5, is more preferred, and a fluorinated binder having a F/C of at least 0.75 and less than 1.3, is furthermore preferred. The amount of the binder to be used varies depending upon the type of the negative electrode active material, the electrode shape, etc., but it is from 1 to 20 wt %, preferably from 2 to 10 wt %, for the negative electrode active material.

Further, the electrically conductive material to be used if necessary may, for example, be acetylene black, graphite or a metal powder. The amount of the electrically conductive material to be used varies depending upon the electrical conductivity of the negative electrode active material, the electrode shape, etc., but a proportion of 2 to 40 wt % for the negative electrode active material is suitable.

Although the thickness of the negative electrode active material is set in balance with the thickness of the positive electrode active material so as to secure the energy density of the cell, considering the output density and the energy density of the cell, industrial productivity, etc, the thickness is usually 15 to 100 μm, preferably 20 to 80 μm, on one side of a current collector.

In LIC of the present invention, the positive electrode contains a positive electrode active material capable of reversibly supporting lithium ions and/or anions such as tetrafluoroborate.

The positive electrode active material is not particularly limited so long as it can reversibly support lithium ions and/or anions, and it may, for example, be an activated carbon, an electrically conductive polymer, or a polyacenic organic semiconductor (PAS) which is a heat-treated aromatic condensed polymer having a polyacenic skeleton structure with an H/C of 0.05 to 0.50.

A method of forming a positive electrode on a positive electrode current collector by using the above positive electrode active material is substantially the same as in the case of the above negative electrode, and its detailed description is omitted.

Further, in LIC of the present invention, it is preferred that the capacitance per unit weight of the negative electrode active material is at least three times the capacitance per unit weight of the positive electrode active material and that the weight of the positive electrode active material is larger than the weight of the negative electrode active material. By properly controlling the doping amount of lithium ions in the negative electrode considering the capacitance of the positive electrode to be used, it is possible that the capacitance of at least three times the capacitance per positive electrode unit weight is secured, and that the positive electrode active material weight can be made larger than the negative electrode active material weight. In such a manner, a capacitor having a higher voltage and a larger capacity as compared with a conventional electric double layer capacitor will be obtained. Further, in a case where a negative electrode having a capacitance per unit weight larger than the capacitance per unit weight of the positive electrode is used, it becomes possible to reduce the negative electrode active material weight without changing the change in potential of the negative electrode, whereby the amount of the positive electrode active material charged tends to increase, whereby the capacitance and the capacity of the cell can be increased. The positive electrode active material weight is preferably larger than the negative electrode active material weight, and it is more preferably from 1.1 times to 10 times. If it is less than 1.1 times, the difference in capacity tends to be small, and if it exceeds 10 times, the capacity may be small on the contrary in some cases, and the difference in thickness between the positive electrode and the negative electrode will be too significant and such is unfavorable in view of the cell structure.

As an electrolyte to be used in LIC of the present invention, an electrolyte capable of transferring lithium ions is used. Such an electrolyte is preferably one which is usually a liquid and which can infiltrate into a separator. As a solvent for such an electrolyte, preferred is an aprotic organic solvent capable of forming an aprotic organic solvent electrolytic solution. The aprotic organic solvent may, for example, be ethylene carbonate, propylene carbonate, dimethyl carbonate, diethyl carbonate, γ-butyrolactone, acetonitrile, dimethoxyethane, tetrahydrofuran, dioxolane, methylene chloride or sulfolane. Further, a liquid mixture having two or more of such aprotic organic solvents mixed may also be used.

Further, an electrolyte to be dissolved in the solvent may be one which is capable of transferring lithium ions and which will not cause electrolysis even at a high voltage, and in which lithium ions can be stably present. Such an electrolyte may, for example, be preferably a lithium salt such as $LiClO_4$, $LiAsF_6$, $LiBF_4$, $LiPF_6$ or $Li(C_2F_5SO_2)_2N$.

The above electrolyte and solvent are mixed in a sufficiently dehydrated state to obtain an electrolytic solution. The concentration of the electrolyte in the electrolytic solution is preferably at least 0.1 mol/L so as to reduce the internal resistance due to the electrolytic solution, more preferably within a range from 0.5 to 1.5 mol/L.

Further, as a separator, a porous body having durability against the electrolytic solution, the electrode active material, etc., having through pores and having no electrical conductivity may be used. The material of the separator may, for example, be a cellulose (paper), a polyethylene or a polypropylene, and known one may be used. Among them, a cellulose (paper) is excellent in view of durability and economical efficiency. The thickness of the separator is not limited but is usually preferably about 20 to about 50 μm.

In LIC of the present invention, in a case of film type cell or square cell of lamination type when two or more electrode units are laminated in a horizontal direction or in a vertical direction to constitute a cell, as mentioned above, lithium metal is disposed as a lithium ion supply source so that lithium ions are preliminarily doped into the negative electrode and/or the positive electrode, between the electrode units to be laminated, or further on the outside of one or both of the electrode units disposed on both ends of the cell. Further, in a case of wind type cell, lithium metal is disposed as a lithium ion source in the same manner at a core portion or at the outermost portion of a wound electrode unit. As the lithium supply source, a material containing at least lithium metal and capable of supplying lithium ions is used, such as lithium metal or a lithium/aluminum alloy.

In such a case, as the amount of the lithium ion supply source (the weight of the material capable of supplying lithium ions such as lithium metal) to be disposed in the interior of the lithium ion capacitor, an amount with which a predetermined capacity of the negative electrode will be obtained is sufficient. However, when an amount larger than this amount is disposed, only a predetermined amount of the lithium metal is doped from the lithium metal and the lithium metal is left in the interior of the capacitor. However, considering the safety, it is preferred to dispose only a required amount so that the entire amount is doped into the negative electrode and/or the positive electrode.

In the present invention, it is preferred to form the lithium metal on a lithium electrode current collector comprising an electrically conductive body having through holes. The electrically conductive body to be the lithium electrode current collector is preferably a metal porous body which will not react with the lithium ion supply source, such as a stainless steel mesh. For example, in a case where lithium metal is used as the lithium ion supply source and an electrically conductive body such as a stainless steel mesh is used as the lithium electrode current collector, it is preferred that at least part of the lithium metal, preferably at least 80 wt % thereof, is embedded in the through hole portion of the lithium electrode current collector, whereby even after lithium ions are doped into the negative electrode, the space to be formed between the electrodes by disappearance of the lithium metal tends to be small, and reliability of LIC will be more securely maintained.

In a case where the lithium metal is formed on the lithium electrode current collector, the lithium metal may be formed on one side or both sides of the porous lithium electrode current collector. In a case of the lithium metal to be disposed on the outside of the electrode unit disposed at the end of the cell, it is preferred to form the lithium metal only on one side of the lithium electrode current collector which faces the negative electrode of the electrode unit. The thickness of the lithium metal to be pressure bonded on the lithium electrode current collector is suitably determined considering the amount of lithium ions to be preliminarily doped into the negative electrode and is not limited, but usually it is from about 50 to about 300 μm on one side of the lithium electrode current collector.

The material of the outer container of LIC of the present invention is not particularly limited, and various materials commonly used for batteries and capacitors may be used. For example, a metal material such as iron or aluminum, a plastic material or a composite material comprising a laminate thereof, may, for example, be used. Further, the shape of the outer container is not particularly limited and is suitably selected from a cylindrical form, a rectangular form, etc. depending upon the purpose of application. In view of reduction in size and reduction in weight of LIC, preferred is an outer container in the form of a film using a laminate film of aluminum with a polymer material such as nylon or polypropylene.

Now, one example of a process for producing LIC of the present invention will be shown below. The through holes of the electrode current collector of LIC may be filled in or may not be filled in with an electrically conductive material, but this example is to explain a case where they are filled in. The through holes of the electrode current collector may be filled in by a known means such as spraying using for example a carbon type electrically conductive material.

Then, each of a positive electrode and a negative electrode is formed on the electrode current collector of which the through holes are filled in with an electrically conducive material. The positive electrode is formed by mixing a positive electrode active material with a binder resin to form a slurry, which is applied on the current collector for a positive electrode and dried. Likewise, the negative electrode is formed by mixing a negative electrode active material with a binder resin to form a slurry, which is applied on the current collector for a negative electrode and dried.

A lithium electrode is formed by pressure bonding lithium metal on a lithium electrode current collector comprising an electrically conductive body having through holes. The thickness of the lithium electrode current collector is about 10 to about 200 μm, and the thickness of the lithium metal depends on the amount of the negative electrode active material used but is usually from 50 to about 300 μm.

After the electrode is dried, it is cut into a width fitted with the size of the outer container of the cell. On that occasion, it is preferred to cut it into a shape having a lead-out portion as a terminal welding portion.

Then, at least three layers of electrode current collectors having electrodes formed thereon are laminated with a separator interposed between the positive electrode and the negative electrode so that they are not in direct contact with each other to assemble an electrode unit, and the outside of the electrode unit is fixed with a tape. On that occasion, the lead-out portions of the positive electrode and the negative electrode are arranged at a predetermined position.

Lithium metal is disposed or each of upper and lower portions of the assembled electrode unit, the lead-out portion of the positive electrode current collector of the assembled electrode unit is welded to the positive electrode terminal, and the lead-out portions of the negative electrode current collector and the lithium electrode current collector are welded to the negative electrode terminal, e.g. by ultrasonic welding.

The electrode unit in which lithium metal is disposed is disposed in an outer container, and the outer container is closed by e.g. heat sealing with an inlet for an electrolytic solution being left unclosed. At least part of the external terminal is exposed to the outside of the outer container so that it can be connected to an external circuit. An electrolytic solution is injected from the inlet for an electrolytic solution of the outer container so that the outer container is filled with the electrolytic solution, and then the inlet for an electrolytic solution is closed by e.g. heat sealing so that the outer container is completely sealed, to obtain a lithium ion capacitor of the present invention.

When the electrolytic solution is injected, all the negative electrodes and the lithium metals are electrochemically contacted with one another, lithium ions dissolved from the lithium metals into the electrolytic solution move toward the negative electrodes as time goes by, and lithium ions in a predetermined amount are doped into the negative electrodes. At the time of making the lithium ions be supported by the negative electrode, it is preferred to make a device such as application of an external force for fixation so as to prevent deformation of the negative electrode due to strain caused by infiltration of lithium ions into the negative electrode, which may impair flatness of the negative electrode. Particularly in the case of a film battery, the contact pressure from the outer container tends to be weaker than that of batteries using a metal case such as a cylindrical battery and a square battery, whereby it is preferred to apply an external pressure to secure flatness of the positive electrode and the negative electrode, whereby the cell itself is less likely to be distorted, and the cell performance will improve.

Thus, in LIC in the preferred embodiment of the present invention, an active material capable of reversibly being doped with lithium ions and/or anions is used for the positive electrode, an aprotic organic solvent solution of a lithium salt is used for the electrolyte, the negative electrode has a capacitance of at least three times the capacitance per unit weight of the positive electrode active material, the positive electrode active material weight is larger than the negative electrode active material weight, lithium metal to preliminarily dope the negative electrode with lithium ions is provided in the cell, and the negative electrode (before charged) can be preliminarily doped with lithium ions.

Further, by using a negative electrode having a large capacitance per unit weight relative to the capacitance per unit weight of the positive electrode, it becomes possible to reduce the negative electrode active material weight with the change in potential of the negative electrode being unchanged, whereby the amount of the positive electrode active material to be charged will be large, and the capacitance and the capacity of the cell will be large. Further, as the capacitance of the negative electrode is large, the change in potential of the negative electrode tends to be small, and resultingly the change in potential of the positive electrode tends to be large, and the capacitance and the capacity of the cell tend to be large.

Further, in a conventional electric double layer capacitor, the positive electrode potential will lower only to about 3 V at the time of discharging, but in the lithium ion capacitor ranging the present invention, the positive electrode potential will lower to 3 V or below as the negative electrode potential is low, whereby a larger capacity as compared with a conventional electric double layer capacitor will be achieved.

Still further, by preliminarily doping the negative electrode with lithium ions in a predetermined amount so as to obtain a required capacity as a negative electrode capacity, the working voltage can be set to be 3 V or higher, and the energy density will improve, as compared with the working voltage of a conventional capacitor of from about 2.3 to about 2.7 V.

Now, the present invention will be explained in detail with reference to specific Examples.

EXAMPLES

Example 1

Process for Producing Negative Electrode 1

A phenol resin molded plate having a thickness of 0.5 mm was put in a Siliconit electric furnace and subjected to a heat treatment by increasing the temperature at a rate of 50°

C./hour to 500° C. and further at a rate of 10° C./hour to 660° C. in a nitrogen atmosphere thereby to synthesize PAS. The PAS plate thus obtained was pulverized with a disk mill to obtain a PAS powder. The PAS powder had a H/C ratio of 0.21.

Then, 100 parts by weight of the above PAS powder and a solution having 10 parts by weight of a vinylidene polyfluoride powder dissolved in 80 parts by weight of N-methylpyrrolidone were sufficiently mixed to obtain a slurry. This slurry was applied on one surface of a copper foil having a thickness of 18 μm in an amount of about 7 mg/cm² as a solid content, dried and pressed to obtain a PAS negative electrode 1.

Process for Producing Positive Electrode 1

100 Parts by weight of a commercial activated carbon powder having a specific surface area of 1,950 m²/g and a solution having 10 parts by weight of a vinylidene polyfluoride powder dissolved in 100 parts by weight of N-methylpyrrolidone were sufficiently mixed to obtain a slurry. This slurry was applied on one surface of an aluminum foil having a thickness of 20 μm coated with a carbon type electrically conducted coating, in an amount of about 7 mg/cm² as a solid content, dried and pressed to obtain a positive electrode 1.

Measurement of Capacitance per Unit Weight of Positive Electrode 1

The above positive electrode 1 was cut out into a positive electrode for evaluation having a size of 1.5×2.0 cm². The positive electrode and lithium metal having a size of 1.5×2.0 cm² and a thickness of 200 μm as a counter electrode were overlaid with a polyethylene nonwoven fabric having a thickness of 50 μm as a separator interposed therebetween to assemble a test cell. Lithium metal was used as a reference electrode. As an electrolytic solution, a solution having $LiPF_6$ dissolved at a concentration of 1 mol/l in propylene carbonate was used.

Charge to 3.6 V at a charge current of 1 mA was carried out and then constant voltage charge was carried out, and after a total charge time of 1 hour, discharge was carried out to 2.5 V at 1 mA. The capacitance per unit weight of the positive electrode 1 was obtained from the discharge time from 3.5 V to 2.5 V and found to be 92 F/g.

Measurement of Capacitance per Unit Weight of Negative Electrode 1

The negative electrode 1 was cut into four negative electrodes for evaluation having a size of 1.5×2.0 cm². Each of the negative electrodes and lithium metal having a size of 1.5×2.0 cm² and a thickness of 200 μm as a counter electrode were overlaid with a polyethylene nonwoven fabric having a thickness of 50 μm as a separator interposed therebetween to assemble a test cell. Lithium metal was used as a reference electrode. As an electrolytic solution, a solution having $LiPF_6$ dissolved at a concentration of 1 mol/l in propylene carbonate was used.

Lithium ions were charged in an amount of 280 mAh/g, 350 mAh/g, 400 mAh/g or 500 mAh/g based on the negative electrode active material weight at a charge current of 1 mA, and then discharge to 1.5 V was carried out at 1 mA. The capacitance per unit weight of the negative electrode is 1 was obtained from the discharge time over which the potential of the negative electrode changed by 0.2 V from the potential one minute went on after initiation of the discharge. The results are shown in Table 1.

TABLE 1

| | Charge amount (mAh/g) | | | |
| --- | --- | --- | --- | --- |
| | 280 | 350 | 400 | 500 |
| Capacitance per unit weight of negative electrode 1 (F/g) | 308 | 463 | 661 | 758 |

The charge amount in this Example is a value obtained by dividing an integrated charge current which was applied to the negative electrode by the negative electrode active material weight, and its unit is mAh/g.

Process for Producing Negative Electrode 2

The above slurry for the negative electrode 1 was applied by coating and molded on both sides of copper expanded metal (manufactured by Nippon Metal Industry, Co., Ltd.) having a thickness of 32 μm (porosity 50%) by a die coater, followed by pressing to obtain a negative electrode 2 having an entire thickness (the total of the thickness of the negative electrode layers on both sides and the thickness of the negative electrode current collector) of 148 μm.

Process for Producing Positive Electrode 2

A non-aqueous carbon type electrically conductive coating (manufactured by Acheson (Japan) Limited, EB-815) was applied to both sides of aluminum expanded metal (manufactured by Nippon Metal Industry, Co., Ltd.) having a thickness of 35 μm (porosity 50%) by spraying and dried to obtain a current collector for a positive electrode having electrically conductive layers formed thereon. The entire thickness (the total of the current collector thickness and the electrically conductive layer thickness) was 52 μm, and through holes were substantially filled in with the electrically conductive coating. The above slurry for the positive electrode 1 was applied by coating and molded on both sides of the positive electrode current collector by a roll coater, followed by pressing to obtain a positive electrode 2 having an entire thickness (the total of the thickness of the positive electrode layers on both sides, the thickness of the electrically conductive layers on both sides and the thickness of the positive electrode current collector) of 312 μm.

Preparation of Electrode Unit

The negative electrode 2 having a thickness of 148 μm was cut into a size of 6.0×7.5 cm² (excluding the terminal welding portion) and the positive electrode 2 having a thickness of 312 μm were cut into a size of 5.8×7.3 cm² (excluding the terminal welding portion), and they were laminated by using as a separator a cellulose/rayon mixed nonwoven fabric having a thickness of 35 μm so that the terminal welding portions of the positive electrode current collectors and the negative electrode current collectors were opposite to each other, so that the positive electrodes and the negative electrodes faced at 20 faces, and so that the outermost portion of the laminated electrode becomes the negative electrode. A separator was disposed at each of the outermost and lowermost portions, four sides were fixed with a tape, and the terminal welding portions of the positive electrode current collectors (10 sheets) and the terminal welding portions of the negative electrode current collectors (11 sheets) were welded by ultrasonic welding to the positive electrode terminal and the negative electrode terminal (each 50 mm wide, 50 mm long and 0.2 mm thick), respectively, whereby two electrode units were obtained. 10 Positive electrodes and 11 negative electrodes were used for each electrode units. The weight of the positive electrode active material was 1.3 times the weight of the negative electrode active material. In terms of the weight of the negative electrode active material in the areas facing to the positive electrode, the weight of the positive electrode active material was 1.4 times the weight of the negative active material in the areas. The areas of the positive electrode was 94% of the areas of the negative electrode.

Preparation of Lithium Ion Capacitor

As a lithium electrode, one produced by press-bonding a lithium metal foil (82 μm, 6.0×7.5 cm², corresponding to 200 mAh/g) to a stainless steel mesh (lithium electrode current collector) of 80 μm thick, was employed, and the lithium electrode is disposed at each of an upper portion and a lower portion of the electrode unit so that each lithium electrode completely faced to the outermost negative electrode, to obtain a tripolar electrode unit. Here, terminal welding portions (two sheets) of the lithium electrode current collector were resistance-welded to negative electrode terminal welding portion.

The tripolar electrode unit was put in the interior of an outer film deep drawn to 6.5 mm and covered with an outer laminated film, and three sides were fused. Then, the unit was vacuum impregnated with a solution having $LiPF_6$ dissolved at a concentration of 1 mol/L in a solvent mixture of ethylene carbonate, diethyl carbonate and propylene carbonate in a weight ratio of 3:4:1 as an electrolytic solution, and the remaining one side was fused, whereby three cells of film type capacitors were assembled. The lithium metal disposed in the lithium ion capacitor corresponded to 400 mAh/g per negative electrode active material weight.

Initial Evaluation of Lithium Ion Capacitor

20 Days after the lithium ion capacitors were left to stand after assembled, one cell was decomposed, whereupon the lithium metal completely disappeared. Accordingly, it was judged that the negative electrodes were preliminarily doped with lithium ions so as to obtain a capacitance of at least 660 F/g per unit weight of the negative electrode active material. The capacitance of the negative electrode is 7.2 times the capacitance of the positive electrode.

Characteristic Evaluation of Lithium Ion Capacitor

A constant current/constant voltage charge was carried out for 1 hour, comprising charge at a constant current of 2,000 mA until the cell voltage became 3.6 V and then application of a constant voltage at 3.6 V. Then, discharge was carried out at a constant current of 200 mA until the cell voltage became 1.9 V. This cycle of from 3.6 V to 1.9 V was repeatedly carried out, and the cell capacity and the energy density were evaluated at the 10th and 1,000th discharges. The results are shown in Table 2. The data are averages of two cells.

TABLE 2

|  | Number of cycles (cycles) | Capacity (mAh) | Energy density (Wh/l) |
| --- | --- | --- | --- |
| Example 1 | 10 | 183 | 11.5 |
|  | 1000 | 178 | 11.1 |

After completion of the above measurement, the positive electrodes and the negative electrodes were short-circuited and the potential of the positive electrode was measured, whereupon it was 0.95 V, which was at most 2.0 V. A capacitor having a high energy density was obtained by preliminarily doping lithium ions into the negative electrodes and/or the positive electrodes so that the positive electrode potential would be at most 2.0 V when the positive electrodes and the negative electrodes were short-circuited. Further, a remaining one cell was disassembled and surfaces of the positive electrode and the negative electrode were observed, but no particular abnormality was observed.

Comparative Examples 1 to 3

Electrode units were obtained in the same manner as Example 1 except that the areas of negative electrodes 2 of 148 μm thick were 6.0×7.5 cm², 5.8×7.3 cm² and 5.6×7.1 cm² (except for terminal welding portions) respectively, and the areas of positive electrodes 2 of 312 μm thick were each 6.0×7.5 cm² (except for terminal welding portions). The weights of positive electrode active materials were 1.4 times, 1.5 times and 1.6 times respectively of the weight of negative electrode active material contained in each of the negative electrodes areas facing to the positive electrodes. Further, the areas of positive electrodes were 100%, 106% and 113% of the area of negative electrodes. With respect to lithium electrodes, the thicknesses of lithium electrode foils were all 82 μm, their sizes were the same as those of negative electrodes, so that they are each corresponded to 200 mAh/g per negative electrode active material weight. The lithium electrode was disposed at each of the upper portion and the lower portion of the electrode unit, to form a tripolar electrode unit, and three cells of film type lithium ion capacitors were assembled in each of the Comparative Examples in the same manner as Example 1. Here, the lithium metal disposed in the lithium ion capacitor correspond to 400 mAh/g per negative electrode active material weight.

20 Days after the lithium ion capacitors were left to stand after assembled, one cell was decomposed, in each Comparative Example, whereupon the lithium metal completely disappeared. Accordingly, it was judged that the negative electrodes were preliminarily doped with lithium ions so as to obtain a capacitance of 660 F/g per unit weight of the negative electrode active material. The capacitance of the negative electrode is 7.2 times the capacitance of the positive electrode.

A constant current/constant voltage charge was carried out for 1 hour, comprising charge at a constant current of 2,000 mA until the cell voltage became 3.6 V and then application of a constant voltage at 3.6 V. Then, discharge was carried out at a constant current of 200 mA until the cell voltage became 1.9 V. This cycle of from 3.6 V to 1.9 V was repeatedly carried out, and the cell capacity and the energy density were evaluated at the 10th and 1,000th discharges. The results are shown in Table 3. The data are averages of two cells.

TABLE 3

|  | Number of cycles (cycles) | Capacity (mAh) | Energy density (Wh/l) |
| --- | --- | --- | --- |
| Comp. Ex. 1 | 10 | 195 | 12.2 |
|  | 1000 | 187 | 11.7 |
| Comp. Ex. 2 | 10 | 185 | 11.6 |
|  | 1000 | 175 | 10.9 |
| Comp. Ex. 3 | 10 | 173 | 10.8 |
|  | 1000 | 159 | 9.96 |

After the above measurements, the positive electrode and the negative electrode of one cell of each Comparative Example were short-circuited and positive electrode potential was measured, and as a result, each of the potentials was about 0.95 V and less than 2.0 V. By preliminary doping lithium ions into the negative electrode and/or positive electrode so that the positive electrode potential becomes at most 2.0 V when the positive electrode and the negative electrode were short-circuited, a capacitor having high energy density was obtained. However, the capacity retention ratio at 1,000th cycle based on the capacity of 10th cycle was 95.9% in Comparative Example 1, 94.6% in Comparative Example 2 and 91.9% in Comparative Example 3, and these capacity retention ratios were slightly lower than 97.3% in Example 1. Further, remaining one cell was disassembled in each Comparative Example, and surfaces of the positive electrode and the negative electrode were observed, a small amount of precipitated product that seems to be lithium metal, was precipitated on a cross section of negative electrode edge portion in each of the cells of Comparative Examples 1 to 3. In Comparative Examples 1 to 3 precipitated lithium metal tend to increase as the negative electrode area is smaller. This is considered to be because electric current is concentrated on edge portions of negative electrodes since charging and discharging occurs also on a portion of positive electrode not facing to the negative electrode, and accordingly, the negative electrode is preferably larger than the positive electrode.

Examples 2 to 4

Preparation of Lithium Ion Capacitor

Electrode units were obtained in the same manner as Example 1 except that the areas of positive electrodes 2 of 312 μm thick were 5.6×7.1 cm$^2$, 5.4×6.9 cm$^2$ and 5.2×6.7 cm$^2$ (except for terminal welding portions) respectively. The weights of positive electrode active material were 1.24 times, 1.16 times and 1.08 times respectively of the weight of negative electrode active material contained in each of the negative electrode areas facing to the positive electrodes. Further, the areas of positive electrode areas were 88%, 83% and 77% respectively of the negative electrode area. As lithium electrodes, ones each formed by press-bonding a lithium metal foil (82 μm, 6.0×7.5 cm$^2$, corresponding to 200 mAh/g) to a stainless steel mesh of 80 μm thick, were employed, and such a lithium electrode was disposed at each of the upper and lower portions of each electrode unit to prepare tripolar electrode unit, and three cells of film type lithium ion capacitors were assembled in the same manner as Example 1. Here, the lithium metal disposed in the lithium ion capacitor correspond to 400 mAh/g per negative electrode active material weight.

Initial Evaluation of Lithium Ion Capacitor

20 Days after the lithium ion capacitors were left to stand after assembled, one cell was decomposed, whereupon the lithium metal completely disappeared. Accordingly, it was judged that the negative electrodes were preliminarily doped with lithium ions so as to obtain a capacitance of 660 F/g per unit weight of the negative electrode active material. The capacitance of the negative electrode is 7.2 times the capacitance of the positive electrode.

Characteristic Evaluation of Lithium Ion Capacitor

A constant current/constant voltage charge was carried out for 1 hour, comprising charge at a constant current of 2,000 mA until the cell voltage became 3.6 V and then application of a constant voltage at 3.6 V. Then, discharge was carried out at a constant current of 200 mA until the cell voltage became 1.9 V. This cycle of from 3.6 V to 1.9 V was repeatedly carried out, and the cell capacity and the energy density were evaluated at the 10th and 1,000th discharges. The results are shown in Table 4. The data are averages of two cells.

TABLE 4

|  | Number of cycles (cycles) | Capacity (mAh) | Energy density (Wh/l) |
| --- | --- | --- | --- |
| Example 2 | 10 | 172 | 10.7 |
|  | 1000 | 167 | 10.4 |
| Example 3 | 10 | 164 | 10.3 |
|  | 1000 | 161 | 10.1 |
| Example 4 | 10 | 155 | 9.7 |
|  | 1000 | 152 | 9.5 |

After the above measurements, the positive electrode and the negative electrode of one cell of each Example were short-circuited and positive electrode potential was measured, and as a result, the potential was about 0.95 V in each cell and the value was less than 2.0 V. By preliminary doping lithium ions into the negative electrode and/or positive electrode so that the positive electrode potential becomes at most 2.0 V when the positive electrode and the negative electrode were short-circuited, a lithium ion capacitor having high energy density was obtained. Among these, making positive electrode area at least 80% of the negative electrode area is further preferred in order to increase energy density. Further, remaining one cell of each Example was disassembled and surfaces of the positive electrode and the negative electrode were observed, and as a result, no particular abnormality was observed. Accordingly, it is preferred that the positive electrode area is less than 100% of the negative electrode area in order to suppress precipitation of lithium metal.

INDUSTRIAL APPLICABILITY

The lithium ion capacitor of the present invention is very useful as a driving or auxiliary storage device for electronic automobiles, hybrid electronic automobiles, etc. Further, it is suitable as a driving storage device for electronic automobiles, motorized wheelchairs, etc., a storage device for various energy generation such as solar energy generation and wind power generation, a storage device for domestic electronic equipment, etc.

The entire disclosure of Japanese Patent Application No. 2005-250123 filed on Aug. 30, 2005 including specification, claims, drawings and summary is incorporated herein by reference in its entirety.

The invention claimed is:

1. A lithium ion capacitor comprising a positive electrode made of a material capable of being reversibly doped with lithium ions and/or anions, a negative electrode made of a material capable of being reversively doped with lithium ions, and an aprotic organic solution of a lithium salt as an electrolytic solution, wherein the positive electrode and the negative electrode are laminated or wound with a separator interposed between them, the area of the positive electrode is smaller than the area of the negative electrode, and the face of the positive electrode is substantially covered by the face of the negative electrode when they are laminated or wound.

2. The lithium ion capacitor according to claim 1, wherein the area of the positive electrode is at least 80% and less than 100% of the area of negative electrode.

3. The lithium ion capacitor according to claim 1, wherein at least one of the positive electrode and the negative electrode each has a current collector having through holes penetrating from the front surface to the back surface, and the negative electrode and/or the positive electrode is doped with lithium ions by electrochemical contact of the lithium ion supply source with the negative electrode and/or the positive electrode.

4. The lithium ion capacitor according to claim 1, wherein the porosity of the current collector is from 5 to 79%.

5. The lithium ion capacitor according to claim 1, wherein the potential of the positive electrode is at most 2.0 V (vs. Li/Li$^+$) after the positive electrode and the negative electrode are short-circuited.

6. The lithium ion capacitor according to claim 1, wherein the negative electrode is made of a negative electrode active material capable of being reversibly doped with lithium ions, the positive electrode is made of a positive electrode active material capable of being reversibly doped with lithium ions and/or anions, the negative electrode active material has a capacitance per unit weight at least three times that of the positive electrode active material, and the weight of the positive electrode active material is larger than the weight of the negative electrode active material.

7. The lithium ion capacitor according to claim 6, wherein the negative electrode active material is any one of graphite, hard carbon and a polyacenic organic semiconductor (PAS) which is a heat-treated aromatic condensed polymer having a polyacenic skeleton structure with an atomic ratio of hydrogen atoms/carbon atoms between 0.50 and 0.05.

8. The lithium ion capacitor according to claim 6, wherein the negative electrode active material has a pore diameter of at least 3 nm and a pore volume of at least 0.10 mL/g.

9. The lithium ion capacitor according to claim 6, wherein the positive electrode active material is any one of an activated carbon, an electrically conductive polymer and a polyacenic organic semiconductor (PAS) which is a heat-treated aromatic condensed polymer having a polyacenic skeleton structure with an atomic ratio of hydrogen atoms/carbon atoms between 0.50 and 0.05.

* * * * *